United States Patent
Yasui

(10) Patent No.: US 7,257,482 B2
(45) Date of Patent: Aug. 14, 2007

(54) MISFIRE DETECTION APPARATUS

(75) Inventor: Yuji Yasui, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/284,145

(22) Filed: Nov. 22, 2005

(65) Prior Publication Data

US 2006/0129307 A1    Jun. 15, 2006

(30) Foreign Application Priority Data

Nov. 29, 2004  (JP) ............................ 2004-343456

(51) Int. Cl.
*G01M 15/11* (2006.01)
(52) U.S. Cl. ................ 701/114; 701/103; 123/406.21; 73/35.04
(58) Field of Classification Search ................ 701/102, 701/103, 107, 111, 112, 114, 115; 73/35.01, 73/35.05, 116, 117.2, 117.3, 118.1; 123/406.14, 123/406.21, 406.27, 406.29
See application file for complete search history.

(56) References Cited

U.S. PATENT DOCUMENTS

| | | | | |
|---|---|---|---|---|
| 5,386,722 A | * | 2/1995 | Meyer et al. ............... 73/117.3 |
| 5,485,374 A | * | 1/1996 | Takaku et al. ................ 701/29 |
| 5,571,958 A | * | 11/1996 | Hoshina .................... 73/117.3 |
| 6,006,157 A | * | 12/1999 | Dai et al. ................... 701/114 |
| 6,243,641 B1 | * | 6/2001 | Andrews et al. ............ 701/102 |

FOREIGN PATENT DOCUMENTS

| | | |
|---|---|---|
| JP | 60-166739 A | 8/1985 |
| JP | 64-15937 A | 1/1989 |
| JP | 11-82150 A | 3/1999 |

* cited by examiner

*Primary Examiner*—Willis R. Wolfe
*Assistant Examiner*—Johnny H. Hoang
(74) *Attorney, Agent, or Firm*—Arent Fox LLP

(57) ABSTRACT

Misfire of an engine is detected by extracting a pressure component of combustion from an output of a pressure sensor disposed in a cylinder. An engine misfire detection apparatus obtains a combustion parameter Cr that is a correlation between a reference signal Fc synchronous with the combustion cycle of the engine and cylinder pressure Pc obtained from an output of a pressure sensor disposed in the cylinder. The apparatus detects a misfire of the engine based on the combustion parameter. A misfire can be accurately detected even under a low load condition because the combustion parameter indicating the combustion component is extracted from the cylinder pressure as a correlation between the reference signal synchronous with the combustion cycle of the engine and the cylinder pressure obtained from the sensor output.

14 Claims, 9 Drawing Sheets

(A)

(B)

MISFIRE DETECTION APPARATUS

BACKGROUND OF THE INVENTION

The present invention relates to a technique for detecting a combustion condition of an internal-combustion engine and in particular it relates to a technique for detecting a misfire of the engine.

Recently, in accordance with enforcements of emission regulations for motor vehicles, precision of detecting a misfire of an engine needs to be improved in order to suppress emission of HC and deterioration of catalysts caused by a misfire.

The Japanese Patent Publication No. H11-82150 (Reference 1) discloses a technique for detecting by a pressure sensor disposed in a cylinder of an engine an occurrence of a misfire based on asymmetry of cylinder pressures before and after a top dead center (TDC).

The Japanese Patent Publication No. S64-015937 (Reference 2) discloses a technique for detecting an occurrence of a misfire by comparing an integral value of the values detected by a pressure sensor disposed in a cylinder of an engine with a threshold value.

The Japanese Patent Publication No. S60-166739 (Reference 3) discloses a technique for correcting ignition timing based on a deviation between cylinder pressure detected in accordance with an output of a pressure sensor disposed in a cylinder of an engine and cylinder pressure that is predetermined with respect to a reference combustion condition.

The integral value of the cylinder pressures or the asymmetry of the cylinder pressures which are utilized in the above-described Reference 1 and Reference 2 may vary due to influence of variations in combustion for each combustion cycle. During a low load time, misfire determination may become difficult because a difference between cylinder pressures at a normal operation time and at a misfire is small.

The technique of the above-described Reference 3 utilizes a deviation between a reference cylinder pressure to be predetermined for each operating condition and an actually-measured cylinder pressure. Since peak values of the cylinder pressures may have some dispersion among engines and may change due to certain aging, precision of misfire detection is unreliable.

Even when no combustion occurs in a cylinder of an engine (that is, at a misfire), a pressure in the cylinder increases by a compression movement of a piston, which is referred to as motoring. When the engine is in a low load condition, it becomes difficult to distinguish between a normal combustion and a misfire because a majority of the detected pressures are the pressures caused by motoring. Thus, there is a need for a technique for enabling detection of a misfire in a cylinder even under such low load condition.

SUMMARY OF THE INVENTION

The present invention detects a misfire of an engine by extracting a pressure component generated with combustion from an output of a pressure sensor disposed in a cylinder and detects a combustion state based on the extracted pressure component.

The present invention provides a misfire detection apparatus for an engine. The apparatus includes means for obtaining a combustion parameter Cr based on a correlation between a reference signal Fc that is in synchronization with combustion in the engine and cylinder pressure Pc that is obtained from an output of a pressure sensor disposed in a cylinder of the engine. The apparatus also includes means for detecting a misfire of the engine based on the combustion parameter Cr.

According to this invention, a misfire can be accurately detected even under a low load condition by using a combustion parameter indicating a combustion component extracted from the cylinder pressure in terms of a correlation between the reference signal synchronous with the combustion cycle of the engine and the cylinder pressure obtained from the sensor output. The engine misfire is detected based on this combustion parameter.

According to one aspect of the present invention, the combustion parameter Cr is a sum of products of discrete values $Pc(i)$ of the cylinder pressure which are obtained at a predetermined rate and synchronous discrete values $Fc(i)$ of the reference signal.

According to another aspect of the present invention, the discrete values $Pc(i)$ of the cylinder pressure are detected for each predetermined crank angle. The discrete values $Fc(i)$ of the reference signal are prepared for each of the predetermined crank angle.

According to a further aspect of the present invention, the combustion parameter Cr is calculated for each combustion cycle or for each of integral multiples of a combustion cycle. When the combustion parameter Cr is smaller than a predetermined threshold value, it is determined that a misfire has occurred in the corresponding one combustion cycle or the corresponding integral multiple of a combustion cycle.

According to yet further aspect of the present invention, the apparatus further includes means for calculating a reference parameter Cr_ls by filtering the combustion parameter value. When a difference between the combustion parameter Cr and the reference parameter Cr_ls is smaller than a predetermined threshold value, it is determined that a misfire has occurred in the corresponding combustion cycle.

According to yet further aspect of the present invention, the reference value is scheduled in accordance with at least one of engine rotation (rpm), engine load condition and ignition timing. The reference value is stored in a storage device.

DESCRIPTION OF THE PREFERRED EMBODIMENTS

Figure 2:
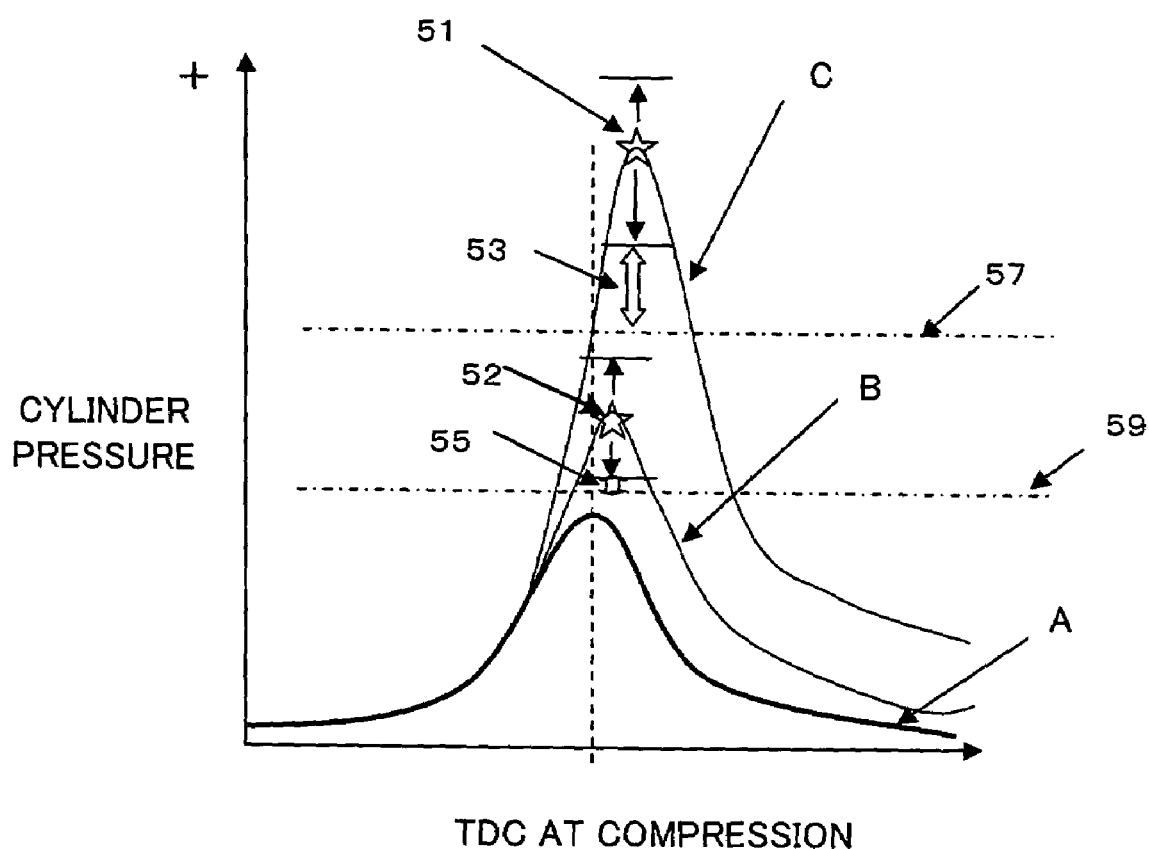
FIG. 2 shows several waveforms of the cylinder pressures illustrating a problem in a misfire detection scheme.

Specific embodiments of the present invention will be now described with reference to the accompanying drawings. FIG. 2 illustrates a problem in a misfire detection technique. The horizontal axis represents crank angle while the vertical axis represents a pressure in a cylinder. A waveform A indicates a compression pressure by piston movement, that is, a motoring pressure, when combustion does not occur in a cylinder. A waveform B indicates a cylinder pressure in normal combustion when the engine operates under a low load condition. Under such low load condition, the peak of the waveform B varies in a range shown by an asterisk mark 52. A waveform C indicates the cylinder pressures in normal combustion when the engine operates under a high load condition. Under such high load condition, the peak of the waveform C varies in a range shown by an asterisk mark 51.

A principle of a typical conventional misfire detection technique is generally as follows. First, threshold values are set with respect to the cylinder pressure in accordance with the engine load conditions. When cylinder pressure detected by a pressure sensor does not reach the corresponding threshold value, it is determined that a misfire has occurred. In FIG. 2, a threshold value in a high load condition is shown as a dotted line 57 and a threshold value in a low load condition is shown as a dotted line 59. Under the high low load condition, the firing detection precision is reliable because there is a substantial allowance between the lower limit of the range 51 for the peak of the waveform C and the threshold value 57 as shown by an arrow 53. However, under the low load condition, the firing detection precision is problematic because allowance between the lower limit of the range 52 for the peak of the waveform B and the threshold value 59 is limited as illustrated by an arrow 55.

Figure 3:
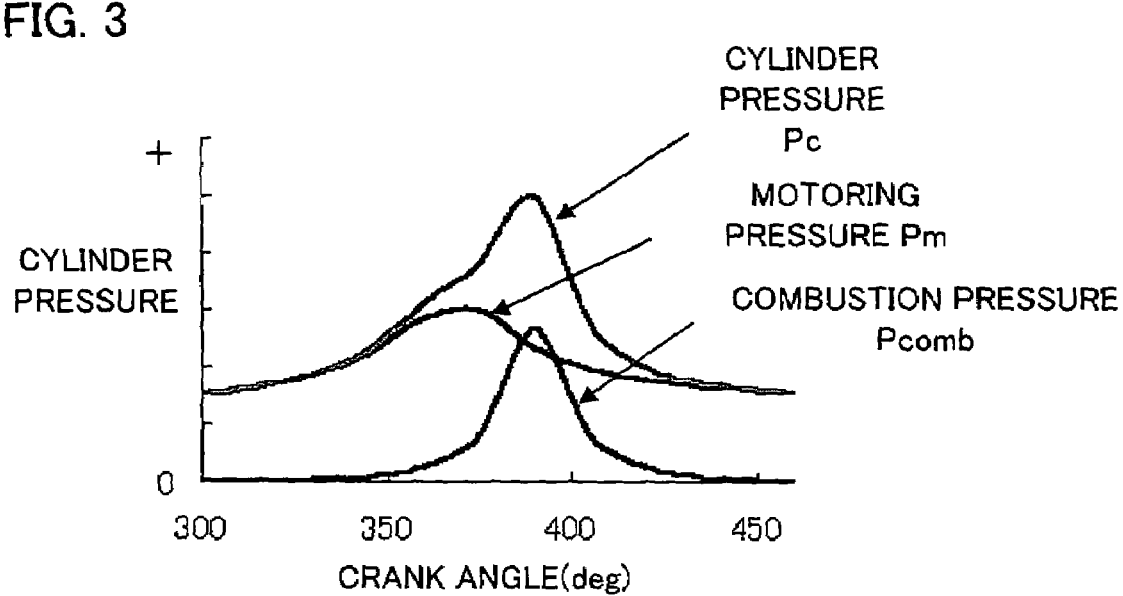
FIG. 3 shows waveforms indicating components of the cylinder pressure.

FIG. 3 shows a relation of the cylinder pressures at the normal combustion and at the misfire. The cylinder pressure Pc at the normal combustion is equal to a sum of the motoring pressure Pm at the no combustion and the pressure Pcomb that is generated by combustion. If the pressure Pcomb generated by combustion can be detected, the misfire can be accurately detected either in the high load condition or in the low load condition.

Thus, according to the present invention, the misfire is detected as follows. First, discrete values Pc(i) of the cylinder pressure are obtained by sampling outputs from a pressure sensor disposed in the cylinder in synchronization with a predetermined crank angle, for example, for every 15 degrees of the crank angle. Then, based on the discrete values Pc(i), a combustion parameter Cr that has a correlation with components generated by combustion is calculated. The misfire is detected based on the calculated combustion parameter Cr.

Figure 4:
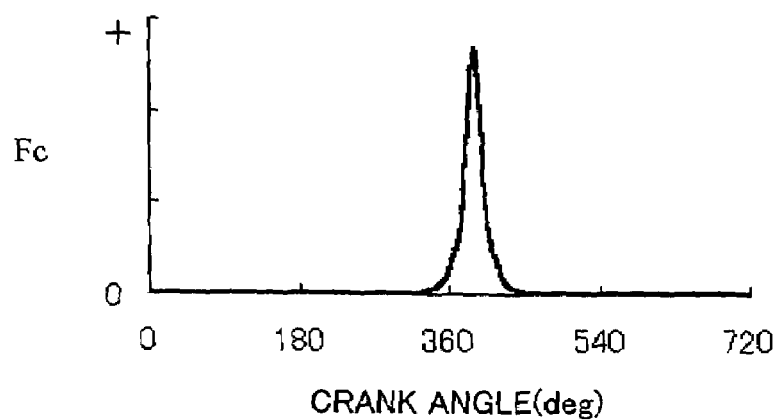
FIG. 4 shows a waveform of the reference signal that is obtained by modeling the pressure Pcomb generated by combustion.

In order to realize such misfire detection scheme, reference signals Fc are prepared in advance by modeling the pressures Pcomb generated by combustion. FIG. 4 shows a waveform of such reference signals Fc. Reference signals Fc are represented by a collection of the discrete values Fc(i) which are synchronized with the crank angles. The reference signals Fc are stored in a storage device. In one embodiment of the present invention, a correlation between the cylinder pressures Pc(i) which are measured by the cylinder pressure sensor and the reference signals Fc(i) is calculated according to the following Equation (1). This correlation is regarded as the combustion parameter Cr.

$$Cr = \frac{1}{N} \sum_{i=n-N+1}^{n} Pc(i)Fc(i) \quad (1)$$

In Equation (1), N represents the number of the sample data in one cycle. For example, when the sampling is performed for every 15 degrees of crank angle, the number N of the sample data in one cycle of 720 degrees of the crank angle is 48.

Figure 5:
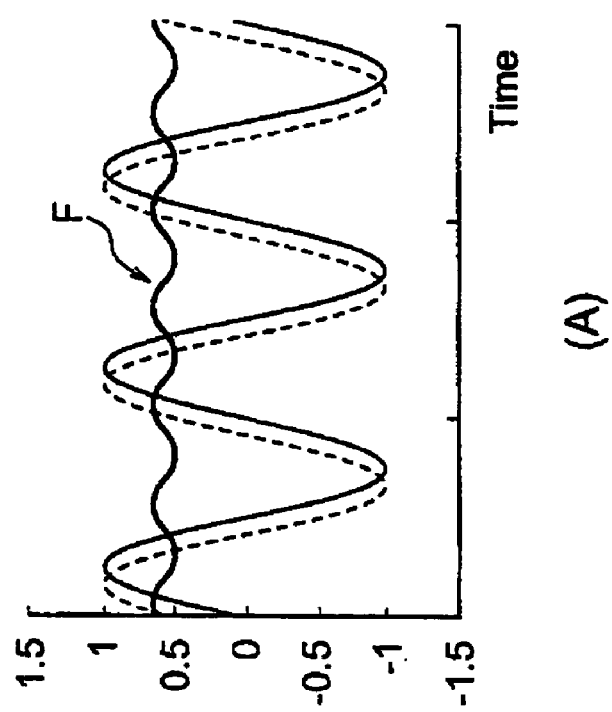
FIG. 5 shows waveforms of a correlation function F of two periodic signals.
Figure 5:
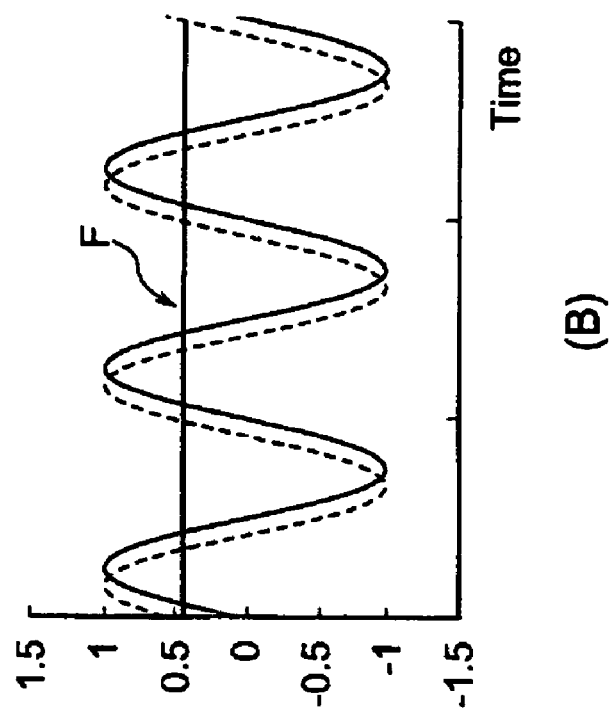

FIG. 5 shows a behavior of a correlation function of typical two periodic functions f1 (a sine curve shown by a solid line) and f2 (a sine curve shown by a dotted line). When the correlation function is calculated in the range other than integral multiples of the period of the signals f1 and f2 including an infinite range, the correlation function F exhibits a periodic behavior as shown in FIG. 5(A). On the other hand, when the correlation function is calculated with respect to a finite range of integral multiples of the periods of the two signals, the correlation function F becomes a constant value.

Accordingly, in one embodiment of the present invention, in order to simplify the process for determining a misfire, the combustion parameter Cr is calculated in the range of integral multiples of the combustion cycle, specifically, one cycle range.

Figure 1:
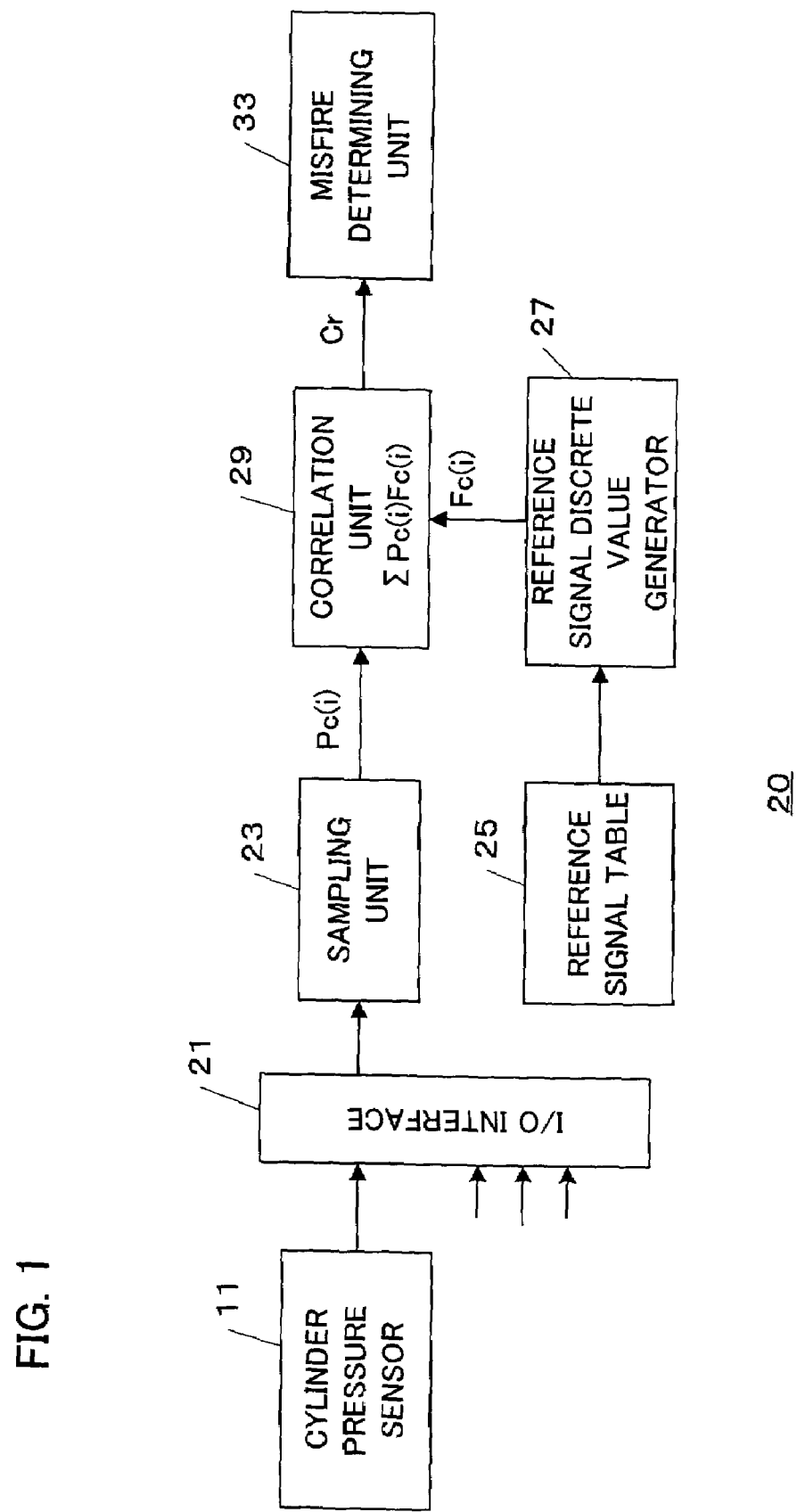
FIG. 1 is a block diagram of an apparatus in accordance with one embodiment of the present invention.

FIG. 1 is a block diagram of a system in accordance with one embodiment of the present invention. Cylinder pressure sensor 11 is a pressure sensor disposed in a cylinder of an engine for a motor vehicle. An output signal of the cylinder pressure sensor 11 is input to an electronic control unit (ECU) 20. The ECU 20 is basically a computer, which includes a central processing unit (CPU), a random access memory (RAM) for providing a working space for the CPU and storing data temporarily and a Read-Only Memory (ROM) for storing computer programs and data. In FIG. 1, functional blocks of the ECU for implementing the present invention are illustrated.

The output signal of the internal pressure sensor 11 is provided to a sampling unit 23 via an I/O interface 21 of the ECU 20. The sampling unit 23 samples the output signal for every 15 degrees of the crank angle. The sampled and digitalized discrete values Pc(i) are provided to a correlation unit 29. In the ROM of the ECU 20, discrete values of reference signals (periodic functions) for every 15 degrees of the crank angle are stored as a reference signal table 25. A reference signal discrete value generating unit 27 reads the discrete values of the reference signal from the reference signal table 25 and provides discrete values Fc(i) to the correlation unit 29.

The correlation unit 29 calculates a combustion parameter Cr in accordance with the above-described Equation (1) and provides the calculated combustion parameter Cr to a misfire determining unit 33. The misfire determining unit 33 compares the combustion parameter Cr with a predetermined threshold value and determines that a misfire has occurred when the value of Cr is smaller than the threshold value.

Figure 6:
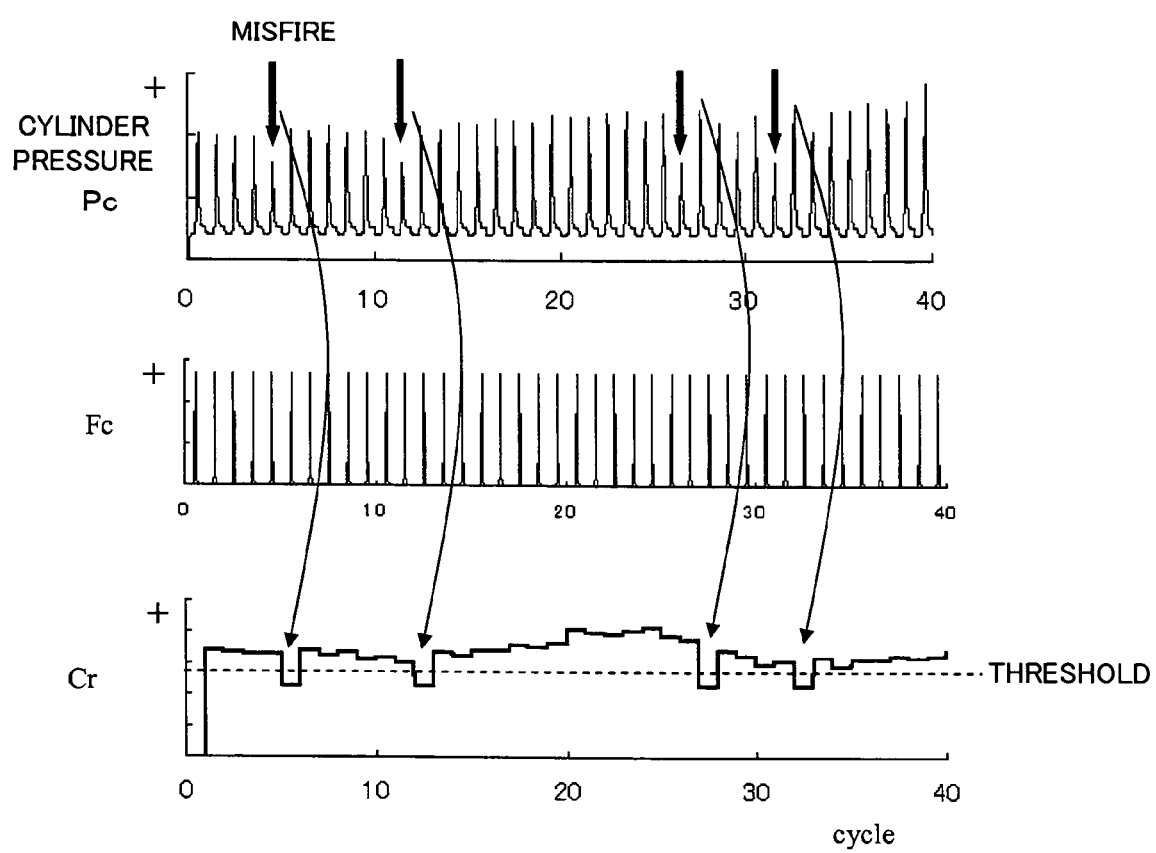
FIG. 6 shows relation among the cylinder pressure Pc, the reference signal Fc and the combustion parameter Cr.

FIG. 6 shows a relation of the waves for the pressures associated with the above-described misfire determination. The top waveform indicates the cylinder pressure Pc detected by the cylinder pressure sensor 11. The middle waveform illustrates the reference signal Fc to be used as references. The bottom waveform illustrates the combustion parameter Cr. As can be seen in FIG. 6, the value of Cr is smaller than the threshold value where misfire takes place as indicated in the waveform of the cylinder pressure Pc.

Now, a second embodiment of the present invention will be described with reference to FIG. 7. The same elements as those in FIG. 1 are given the same reference numbers. In order to improve the precision in misfire detection, the threshold value for misfire determination needs to be changed in accordance with the operating conditions as the cylinder pressure Pcomb (FIG. 3) generated by combustion varies with the operating conditions which change with changing load.

The second embodiment copes with this problem by keeping the misfire determination threshold value constant while adjusting the combustion parameter Cr. It is observed that the combustion parameter Cr shows no significant change over adjacent combustion cycles in the normal combustion because the engine load condition does not change over the adjacent combustion cycles. Therefore, in this embodiment, a reference parameter Cr_ls to be used for determining misfire is calculated in accordance with the following filtering process (a sequential least squares method, a fixed gain method).

$$Cr\_ls(k) = Cr\_ls(k-1) + \frac{P}{1+P} e\_ls(k) \quad (2)$$

where $$e\_ls(k) = Cr(k) - Cr\_ls(k-1)$$

Figure 7:
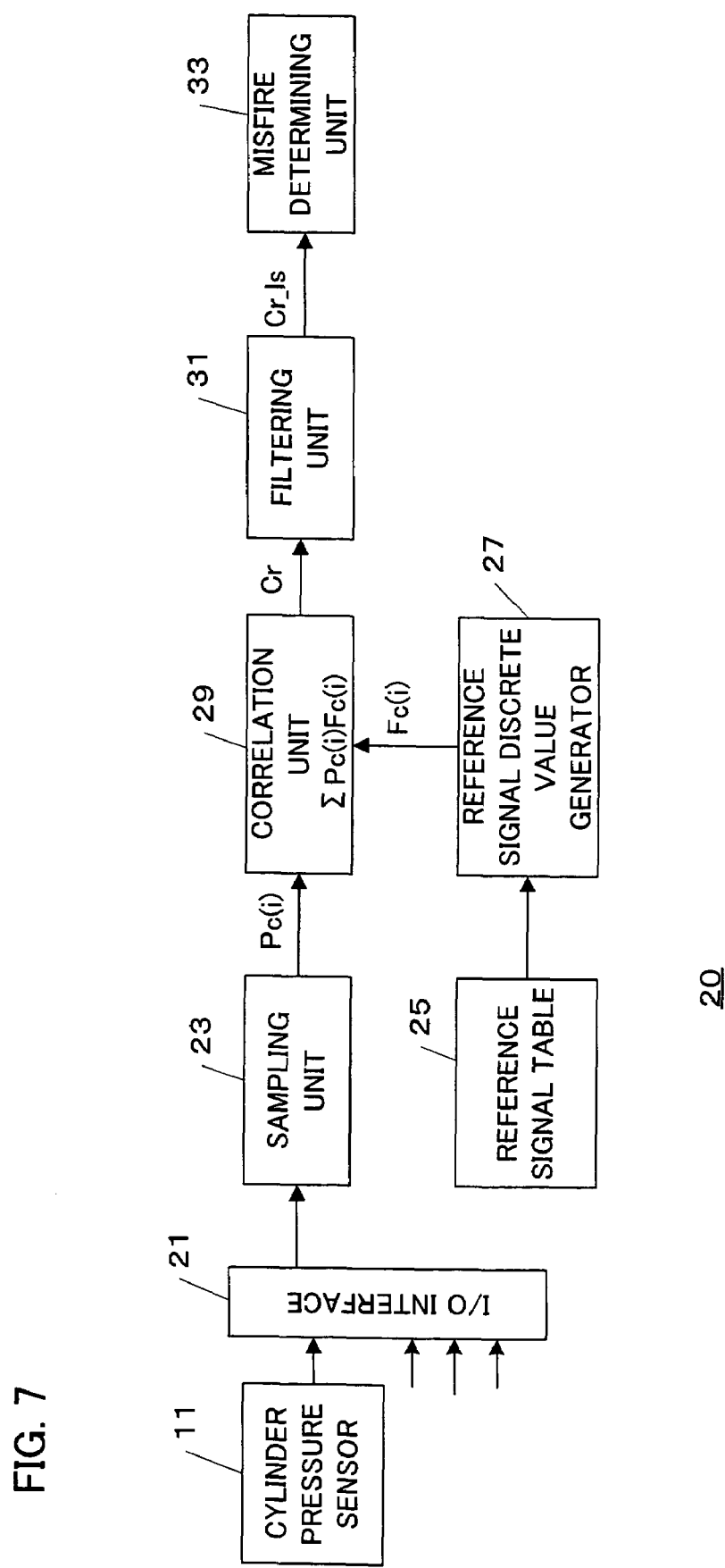
FIG. 7 is a block diagram of an apparatus in accordance with a second embodiment of the present invention.

Referring to FIG. 7, a filtering unit 31 receives a combustion parameter Cr from the correlation unit 29 and calculates a reference parameter Cr_ls in accordance with Equation (2). The calculated reference parameter Cr_ls is provided to the misfire determining unit 33. The misfire determining unit 33 calculates a determination parameter Dcr(k)=Cr(k)−Cr_ls(k). When this determination parameter is smaller than a threshold value, it is determined that a misfire has occurred.

Figure 8:
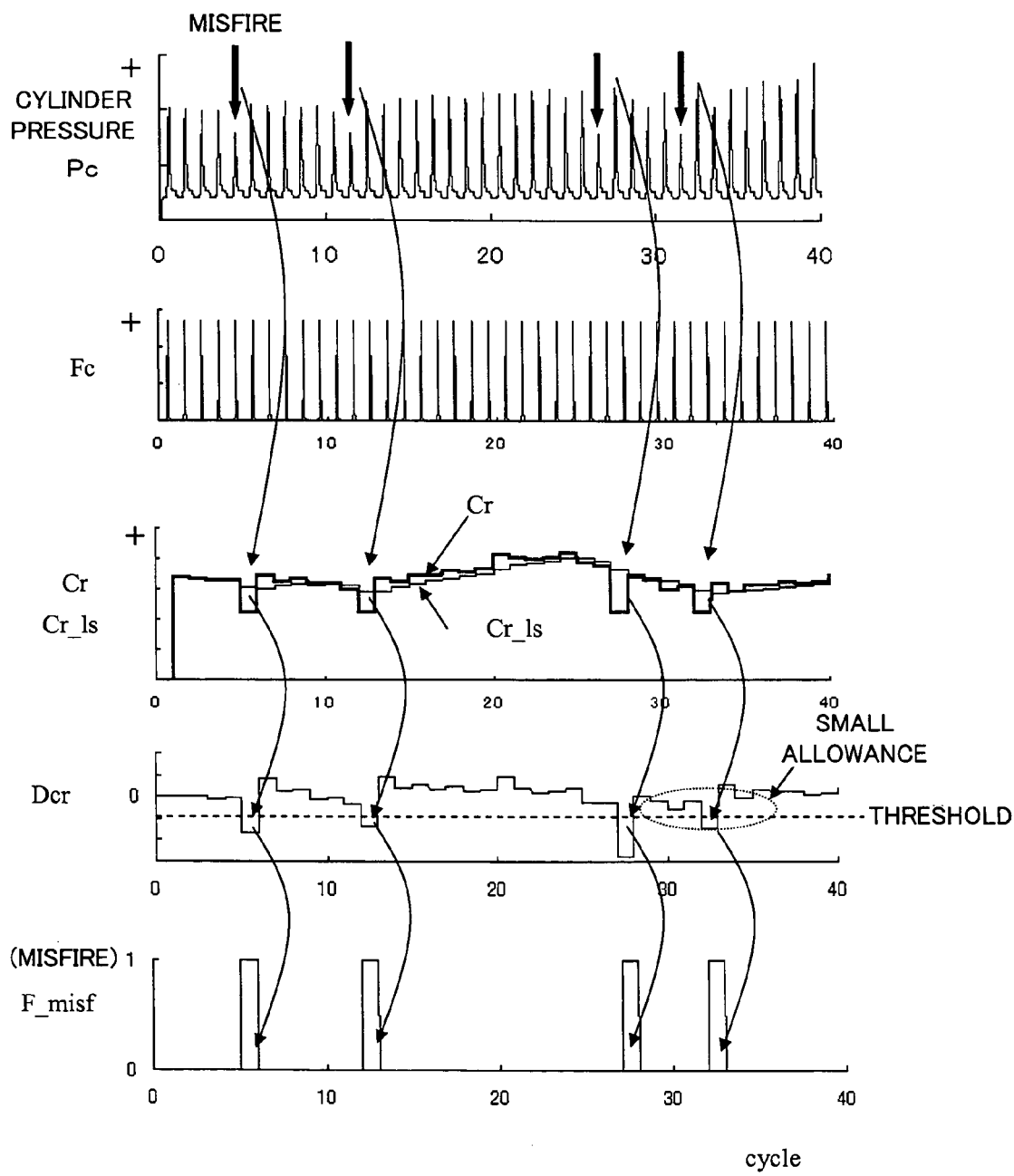
FIG. 8 shows schematic charts illustrating the scheme of determinining a misfire in accordance with the second embodiment.

FIG. 8 shows a relation of the waves for the pressures associated with the above-described second embodiment. The top waveform indicates the cylinder pressure Pc obtained from the output of the cylinder pressure sensor 11. The second waveform from the top indicates the reference signal Fc to be used as references. The third waveform from the top indicates the combustion parameter Cr and the reference parameter Cr_ls that is obtained by the filtering-process upon the combustion parameter Cr. The forth waveform from the top indicates the determination parameter Dcr. As can be seen from the waveform at the bottom of FIG. 8, a misfire flag F_mis indicating occurrence of a misfire is set when the determination parameter Dcr is smaller than the threshold value.

Although a fixed function is used as a reference signal Fc in the above description, the precision in the misfire detection can be improved by scheduling the reference signal Fc in accordance with the engine rotation, the operation load, the ignition timing or the like as described below. Temporal form of the pressure component Pcomb (FIG. 3) generated by combustion in the cylinder changes as the engine load, the engine rotation and others change. For example, a combustion takes a longer time at a low rotation due to decrease of movement in the cylinder, and at a medium rotation, the combustion takes a shorter time due to increase of the movement. At a high rotation, the absolute time of one cycle is shortened, and combustion time looks prolonged in terms of crank angle, which is the basis for sampling. When the ignition timing is retarded, occurrence timing of the cylinder pressure generated by combustion delays and the peak value decreases. Moreover, when the load (intake air amount) increases, air-fuel mixture to be burned increases, so that the combustion time may be prolonged and the peak value may increase.

Figure 9:
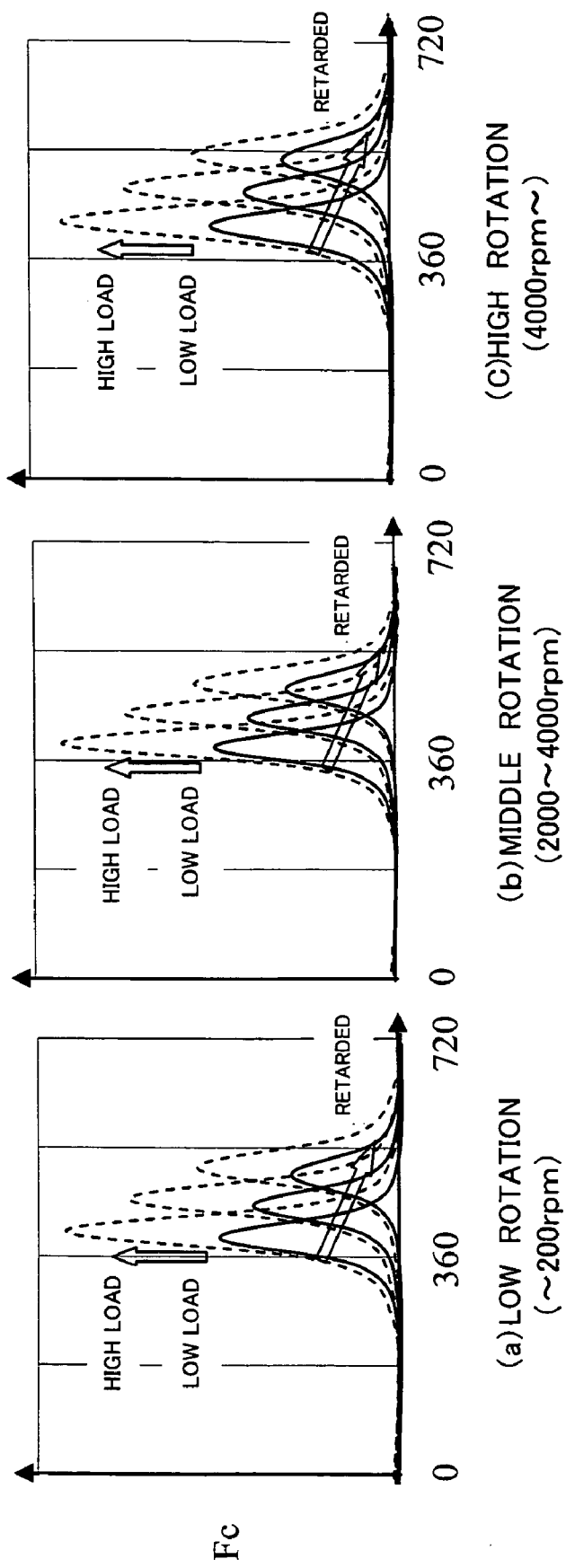
FIG. 9 shows schematic charts illustrating scheduling of the reference signal Fc responsive to engine rotation, engine load and the retarding degree of the ignition timing in accordance with the second embodiment of the present invention.

Thus, in one embodiment of the present invention, the reference signal Fc obtained by modeling the cylinder pressure generated by combustion is changed in accordance with the engine rotation, the operation load, the ignition timing or the like. FIG. 9(a) shows variations of the reference signal Fc in accordance with the load condition and the retarding degree of the ignition timing when the engine rotation is smaller than 2000 rpm. Similarly, FIG. 9(b) shows variations of the reference signal Fc when the engine rotation ranges from 2000 to 4000 rpm and FIG. 9(c) shows variations of the reference signal Fc when the engine rotation exceeds 4000 rpm. These Fc values are set in advance and stored as the reference signal table 25 in the ROM of the ECU 20. The reference signal discrete value generating unit 27 reads from the reference signal table 25 the reference signal discrete value corresponding to the engine rotation, the load condition (which is indicated by, for example, the intake air amount) and the retarding degree of the ignition timing (which is indicated by an ignition timing control function of the ECU 20). The discrete values are provided to the correlation unit 29.

Figure 10:
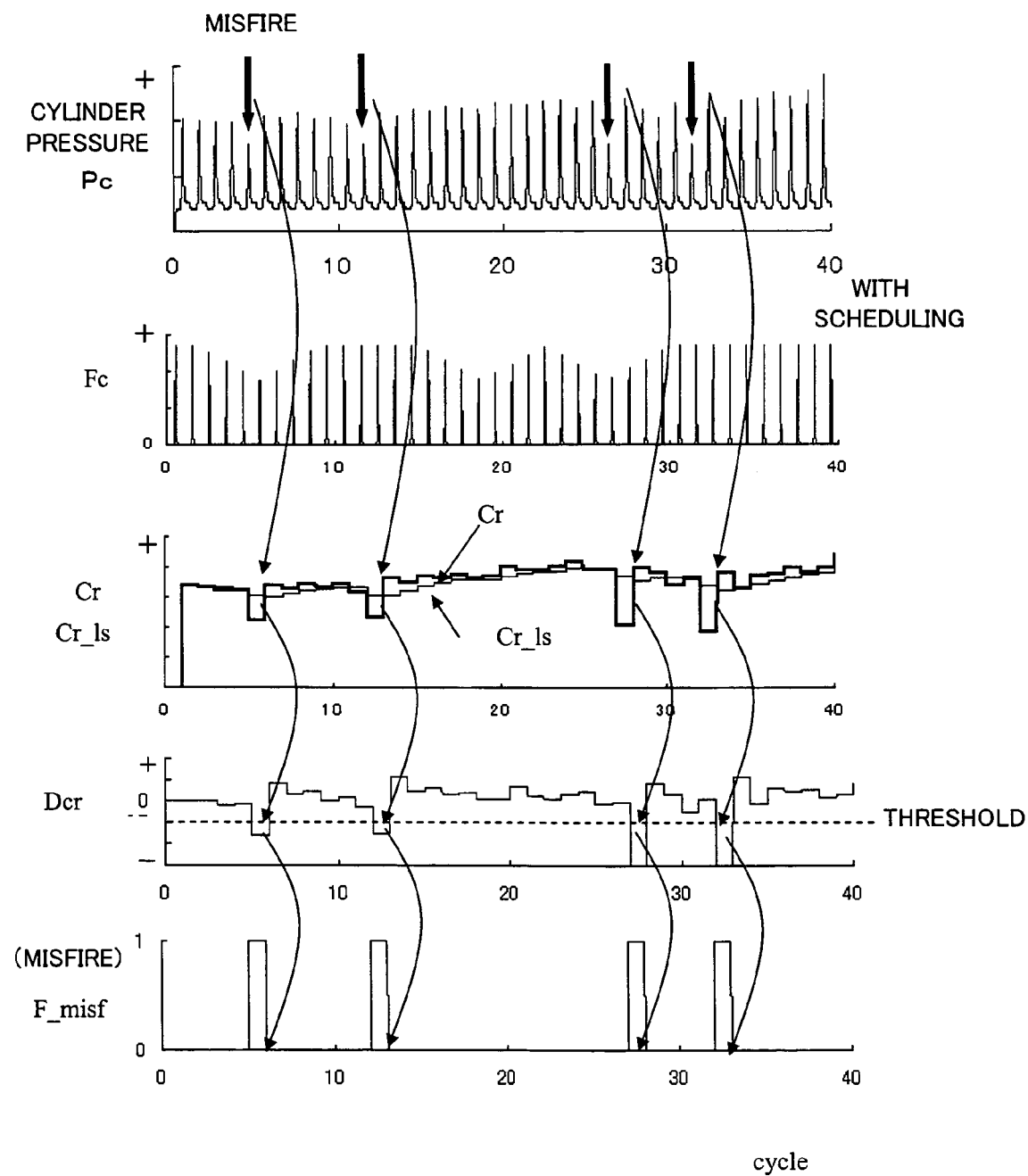
FIG. 10 shows equivalent charts to FIG. 8 where the reference signal Fc is scheduled.

In FIG. 8, where the above-described scheduling process is not applied to the reference signal Fc, it is observed that an allowance between Dcr and the determination threshold value is small even at the place in which misfire occurs as shown in the forth waveform from the top illustrating parameter Dcr. In FIG. 10, which shows waveforms corresponding to those in FIG. 8, but in which the scheduling process is applied to the reference signal Fc, a sufficient allowance is observed between the determination parameter Dcr and the threshold value.

Although the present invention has been described with reference to some specific embodiments, the present invention should not be limited to those specific embodiments.

What is claimed is:

1. A misfire detection apparatus for an engine, the apparatus comprising:
    means for determining a combustion parameter based on a correlation between a reference signal obtained by modeling a pressure component produced by combustion in a cylinder of the engine and cylinder pressure obtained from output of a pressure sensor disposed in the cylinder of the engine, the reference signal being synchronous with the combustion in the cylinder;
    means for detecting a misfire of the engine based on the combustion parameter; and
    means for calculating a reference parameter by filtering the combustion parameter.

2. The misfire detection apparatus of claim 1, wherein the combustion parameter is a sum of products of discrete values Pc(i) of the cylinder pressure of a predetermined rate and discrete values Fc(i) of the reference signal synchronous with the cylinder pressure.

3. The misfire detection apparatus of claim 2, wherein the discrete values Pc(i) of the cylinder pressure are detected for each predetermined crank angle and the discrete values Fc(i) of the reference signal are prepared for each predetermined crank angle.

4. The misfire detection apparatus of claim 3, wherein the combustion parameter is calculated for each combustion cycle or for each of integral multiples of a combustion cycle.

5. The misfire detection apparatus of claim 4, wherein when the combustion parameter is smaller than a predetermined threshold value, it is determined that a misfire has occurred in the corresponding one combustion cycle or the corresponding integral multiple of a combustion cycle.

6. The misfire detection apparatus of claim 1, wherein when a difference between the combustion parameter and the reference parameter is smaller than a predetermined threshold value, it is determined that a misfire has occurred in the corresponding combustion cycle.

7. The misfire detection apparatus of claim 1, wherein the reference value is scheduled in accordance with at least one of an engine rotation, an engine load condition and an ignition timing, the scheduled reference value being stored in a storage device.

8. A misfire detection method for an engine, comprising:
determining a combustion parameter based on a correlation between a reference signal obtained by modeling a pressure component produced by combustion in a cylinder of the engine and cylinder pressure obtained from output of a pressure sensor disposed in the cylinder of the engine, the reference signal being synchronous with the combustion in the cylinder;
detecting a misfire of the engine based on the combustion; and
calculating a reference parameter by filtering the combustion parameter.

9. The method of claim 8, wherein the combustion parameter is a sum of products of discrete values $Pc(i)$ of the cylinder pressure of a predetermined rate and discrete values $Fc(i)$ of the reference signal synchronous with the cylinder pressure.

10. The method of claim 9, wherein the discrete values $Pc(i)$ of the cylinder pressure are detected for each predetermined crank angle and the discrete values $Fc(i)$ of the reference signal are prepared for each predetermined crank angle.

11. The method of claim 10, wherein the combustion parameter is calculated for each combustion cycle or for each of integral multiples of a combustion cycle.

12. The method of claim 11, wherein when the combustion parameter is smaller than a predetermined threshold value, it is determined that a misfire has occurred in the corresponding one combustion cycle or the corresponding integral multiple of a combustion cycle.

13. The method claim 8, wherein when a difference between the combustion parameter and the reference parameter is smaller than a predetermined threshold value, it is determined that a misfire has occurred in the corresponding combustion cycle.

14. The method of claim 8, wherein the reference value is scheduled in accordance with at least one of an engine rotation, an engine load condition and an ignition timing, the scheduled reference value being stored in a storage device.

* * * * *